United States Patent [19]
Cheatwood

[11] 3,893,465
[45] July 8, 1975

[54] GUIDE DEVICE FOR PLASTIC TUBE EXTRUSION

[75] Inventor: Lowell K. Cheatwood, Oklahoma City, Okla.

[73] Assignee: Jess & Lowell Well Casing Co., Oklahoma City, Okla.

[22] Filed: Apr. 22, 1974

[21] Appl. No.: 462,819

[52] U.S. Cl. ............... 134/122; 134/9; 266/3 R; 266/6 R; 425/378 R; 425/392
[51] Int. Cl. .............................................. B05c 3/15
[58] Field of Search .............. 134/9, 15, 64, 122; 266/3 R, 6 R; 425/378 R, 392

[56] References Cited
UNITED STATES PATENTS

| | | | |
|---|---|---|---|
| 1,924,099 | 8/1933 | Bain et al. | 134/122 UX |
| 3,350,248 | 10/1967 | Demarest, Jr., et al. | 134/122 X |
| 3,509,890 | 5/1970 | Phillips | 134/122 |
| 3,844,700 | 10/1974 | Sokolow | 425/392 X |

FOREIGN PATENTS OR APPLICATIONS 14,109 4/1956 Germany .................. 134/122

*Primary Examiner*—Robert L. Bleutge
*Attorney, Agent, or Firm*—Robert M. Hessin

[57] ABSTRACT

Apparatus for use in combination with plastic tube extrusion machinery of the type which heat extrudes continuous tubing for axial passage through a coolant filled elongated chamber, the apparatus consisting of one or more resilient, arcuate bearing members disposed along the elongated chamber in contact with the extruded tubing during the cooling phase and until required rigidity is achieved. The bearing members consist of one or more resilient pads adjustably clamped along a channel member which is rigidly secured axially along the elongated chamber and which includes a coolant water source led directly along the under side of the channel member and extending over each of the resilient pads.

8 Claims, 3 Drawing Figures

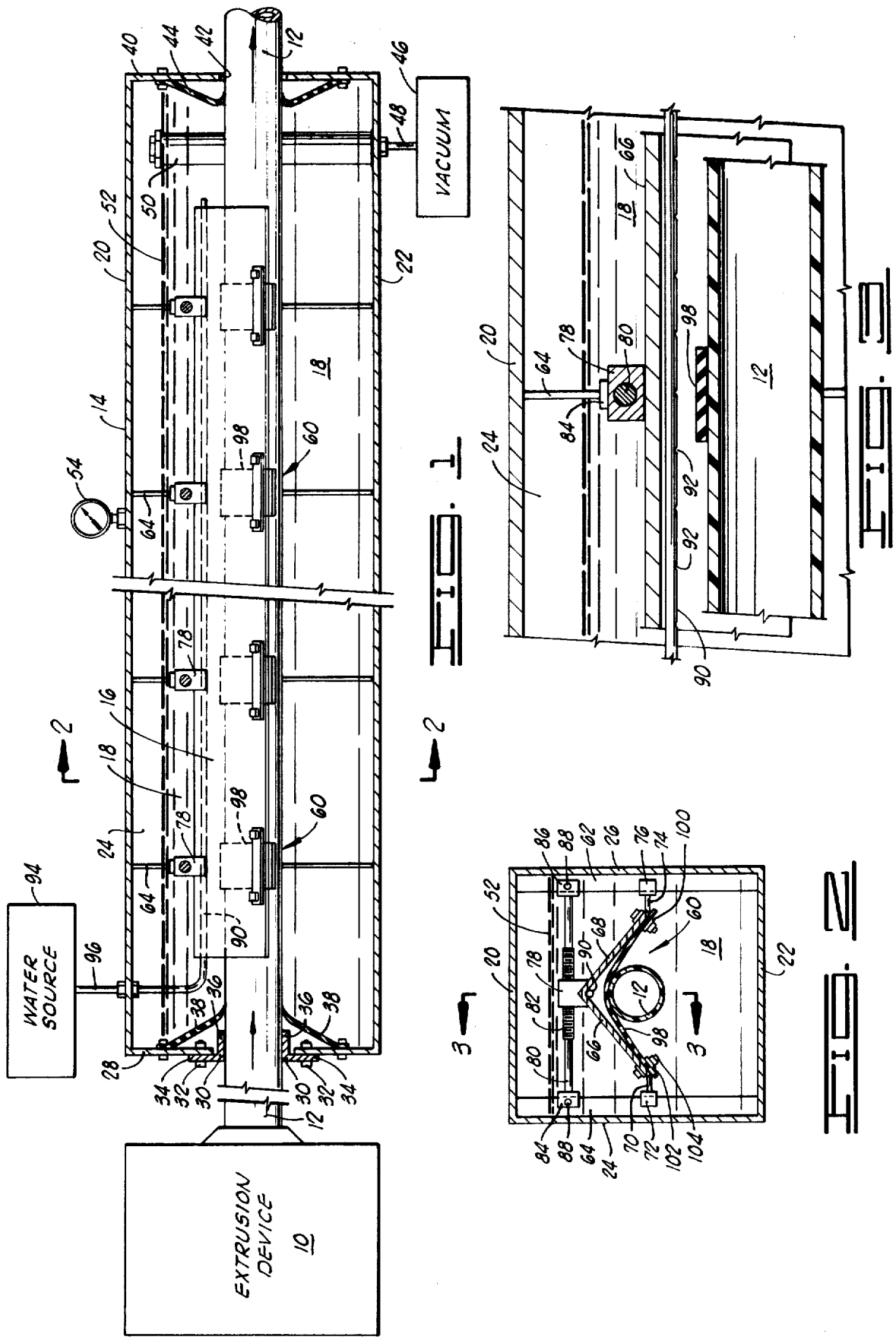

GUIDE DEVICE FOR PLASTIC TUBE EXTRUSION

BACKGROUND OF THE INVENTION

1. Field of the Invention

The invention relates generally to plastic pipe extrusion and, more particularly, but not by way of limitation, it relates to improvements in apparatus for continuous cooling of extruded plastic tubing.

2. Description of the Prior Art

The prior art includes several types of bearing assembly which performs the function of positioning the extruded tubing as it passes along through an elongated cooling chamber. Such prior art devices are such as roller devices and other rigid tensioning devices which serve to hold the extruded plastic tubing downward and in a linear path as it passes through the water-filled coolant chamber; however, the natural buoyancy of the plastic plus the buoyancy of the air-filled interior tend to bow the extruded plastic tubing upward and rigid mechanical bodies, when used as a hold down member, tend to force the plastic tubing out of round such that it takes a non-cylindrical set by the time it reaches the output end of a water-filled cooling chamber.

SUMMARY OF THE INVENTION

The present invention contemplates an adjustable, resilient tensioning member which functions to hold heat extruded plastic tubing downward within a cooling water bath during its transverse therethrough, and the tensioning device so functions to assure maintenance of proper round of the tubing as it takes permanent set through the cooling chamber. The tensioning device includes a plurality of adjustable, resilient pads disposed therealong as well as a continuous cooling water injection along the length of the tensioning device and immediately above the plastic tubing passing therethrough.

Therefore, it is an object of the present invention to provide a water cooling chamber for cooling extruded plastic tubing which does not alter the roundness characteristics of the finished tubing.

It is also an object of the invention to provide cooling apparatus for heat extruded plastic tubing which is adjustable for any of various diameters of tubing or speeds of extrusion.

Finally, it is an object of the present invention to provide an improved tensioning device for use as a hold-down guide member in a water-filled cooling bath, which device is economical, readily adjustable and reliable in operation.

Other objects and advantages of the invention will be evident from the following detailed description when read in conjunction with the accompanying drawing which illustrates the invention.

BRIEF DESCRIPTION OF THE DRAWING

FIG. 1 is a longitudinal vertical section of a cooling chamber constructed in accordance with the present invention, ancillary components being shown in block form;

FIG. 2 is a transverse vertical section through the cooling chamber of FIG. 1 as taken along lines 2—2 of FIG. 1 to illustrate the invention; and FIG. 3 is a partial longitudinal section taken along lines 3—3 of FIG. 2.

DETAILED DESCRIPTION OF THE PREFERRED EMBODIMENT

An extrusion device 10 of well-known and commercially available type is utilized for the purpose of extruding plastic tubing 12 continuously at prescribed inner and outer diameter dimension in accordance with the particular die selected. The extrusion device 10 may utilize any of various plastic polymers in the extrusion process, but a well known present day practice is that of extruding polystyrene into large diameter tubing for use as well casing, pipe applications and the like. One form of extrusion device 10 is commercially available from the National Rubber Machine Company of Akron, Ohio.

Once the extruded material is emitted from extrusion device 10 it is necessary to cool such material through utilization of a coolant bath or the like so that the extruded material will take set in its desired shape or cross-sectional configuration. One form of cooling chamber suitable for such operation is known as a vacuum sizing machine and is commercially available from the Gato Machine Company of Farmingdale, N.Y. The illustration of FIG. 1 shows a modified vacuum sizing machine or cooling chamber 14 which is adapted to include a tensioning device 16 submerged in the coolant or water bath 18 and positioned axially along the path of extruded tubing 12.

Referring also to FIGS. 2 and 3, the chamber 14 may consist of such as a generally elongated and cubical metallic enclosure having upper and lower walls 20 and 22 each continuous with side walls 24 and 26 as adapted for containing the coolant bath or water 18. A forward end wall 28 is formed with a centrally aligned hole over which is affixed a centrally aligned entry die 30 as affixed to end wall 28 by means of screws 32. The entry die 30 is formed as an annular plate 34 suitably secured, or unitarily formed, to include a cylindrical aluminum sleeve 36. The entry die 30 is changeable for whatever size tubing is to be extruded in the extrusion device 10 such that the respective sleeve 36 will maintain a relatively loose fit to the outside diameter of the extruded tubing 12 upon entry into the chamber 14. An additional rubber or neoprene diaphragm 38 is disposed about the inner wall of end wall 28 and selected to be of a size which tightly surrounds tubing 12 and insures adequate water seal in the presence of internal vacuum within chamber 14, as will be further described below.

A rearward end wall 40 of chamber 14 is formed with a central, circular opening 42 through which the cooled and set extruded tubing 12 passes, and leakage of the water bath is prevented by a rubber or neoprene diaphragm 44 which closes sufficiently tightly around tubing 12 to prevent water loss, especially as aided by the internal vacuum within chamber 14. A standard form of compressor may be utilized as vacuum source 46 which functions via conduit 48 and a filtered drain pipe 50 not only to maintain desired vacuum within chamber 14 but also to maintain water level 52 at a preset height. The amount of vacuum or internal pressure within chamber 14 is indicated by a pressure gauge 54, and the amount of vacuum drawn by vacuum source 46 will vary slightly with each size of tubing 12 which is being extruded. For example, in the case of extrusion of 5 inch O.D. tubing having 0.375 inch wall thickness, vacuum is set so that gauge 54 reads about 10 inches mercury, e.g. about one-third normal atmospheric pressure. The reduced internal pressure of chamber 14 is adjusted so that surrounding pressure acting through water body 18 will not exert an oppressive force on the walls of tubing 12 and cause any form of collapse or elliptic distortion. The reduced internal pressure within chamber 14 also renders the sealing requirements of diaphragms 38 and 44 less stringent. A suitable roller or movable support assembly supports tubing 12 after exit from the chamber 14 whereupon the tubing is then cut or further finished for storage and/or transportation.

Due to the fact that the plastic material of tubing 12 has a degree of buoyancy and also has a volume of air entrapped within, the cooling tubing 12 as it traverses through chamber 14 will tend to rise in waterbath 18 and in so doing lose its roundness characteristics through the setting period, i.e. during coolant bath immersion. Thus, tensioning device 16 is utilized as a hold-down assembly and functions through utilization of a plurality of resilient bearing members 60 to maintain tubing 12 in axially linear position without imparting any elliptical set to tubing 12.

With reference to FIGS. 1 through 3, a plurality of vertical support plates 62 and 64 are suitably secured as by welding along the respective side walls 26 and 24 of chamber 14. The support members 62 and 64 provide a clamping seating for positioning structure which maintains the resilient bearing members 60 properly centered with respect to the axis of travel of tubing 12 through chamber 14. Tensioning device 16 consists of an angle member made up of side plates 66 and 68 joined along one edge thereof at an angle of from 90° to 110°. It has been found that an angle of 90° is more suitable for smaller diameter tubing while an angle of 110° is desirable on tubing of larger diameter. A plurality of support rods 70 are suitably secured as by welding at spaced points along the outer edge of plate 66 and interconnected with a U-shaped positioning member 72 which is adapted to seat slidingly on each of the respective support members 64. In like manner, the opposite side of tensioning device 16 is positioned utilizing a pluralilty of rods 74 affixed to the outer edge of plate 68 and a U-shaped slide member 76 which is positioned around each of the respective side support members 62. The upper corner of tensioning device 68 is supported by a plurality of transversely threaded blocks 78 which are secured as by welding along the upper angular edge of tensioning device 16. Each of blocks 78 is supported by a rod 80 having threaded central portion 82 and being connected at each end to a U-shaped clamp 84 and 86. Each of clamps 84 and 86 envelope the inner edge of respective support members 64 and 62 and include respective set screws 88 for maintaining the adjusted position. Thus, in initially aligning the tensioning device 16, lateral adjustment is made by rotation of rod 80 and transverse positioning of block 78, while vertical adjustment is made by upward or downward movement of rod 80 with final clamping by tightening of set screws 88.

A cooling tube 90, e.g. ¼ inch copper tubing, is secured to run immediately under the upper or angular portion of tensioning device 16 and is formed with a plurality of closely spaced holes 92 (see FIG. 3) therealong to continually emit coolant as derived from external water source 94 via conduit 96. The temperature and pressure of water from water source 94 is adjusted in accordance with the exigencies of the particular extrusion operation, i.e. the type of plastic material, extrusion temperatures, etc. It is also contemplated that tensioning device 16 include a large plurality of perforations 97 thereby to allow free flow of cooling fluid about tubing 12.

Each of bearing members 60 includes a resilient bearing strap 98 which is adjustably clamped to bear against the upper surface of the extruded tubing 12 and to provide a downward bearing force which is distributed around the upper portion of tubing 12 as a function of the tangent to the cross-section of tubing 12. The straps 98 are each formed of ½ inch sheet rubber or neoprene and are preferably of 50 durometer hardness, and each of straps 98 is approximately 6 inches in width. The specification of durometer, thickness and width of straps 98 enable a self-adjusting function wherein the hold-down force in positioning is able to vary within requisite limits without imposing undue distortional stresses.

Each of the straps 98 is adjustably clamped at the respective spaced position along tensioning device 16. Thus, one side of strap 98 is permanently secured by means of a bar clamp 100, while the opposite end of strap 98 is adjustably secured by manual positioning of strap 98 transversely and subsequent tightening of bolts 104 against a clamping bar 102.

In operation, the coolant chamber 14 is initially set up in accordance with the size of tubing 12 to be extruded. This necessitates inclusion of the proper size of entry die 30 as well as adjustment of each of the spaced resilient bearing members 60 along tensioning device 16. Vertical and horizontal centering of tensioning device 16 is accomplished by rotating rod 80 and vertical positioning of clamping blocks 84 and 86 with subsequent fastening by set screws 88. Secondarily, the tensioning of each of resilient straps 98 through adjustment of clamping bar 102 and clamping bolts 104 will provide the requisite hold-down tensions along tubing 12 as it progresses from the hot or extruded end of chamber 14 through to the rearward or cooled end wherein tubing 12 has taken its final set.

Cold water from water source 94 is applied through tube 90 and a plurality of closely spaced emission holes 92 (FIG. 3) to provide continual entry of cooling water, and water level 52 is maintained by drainpipe 50 through which reduced pressure is maintained by vacuum apparatus 46. Such reduced pressure is preadjusted, as read at gauge 54, and maintained on the order of 10 inches mercury or one-third atmospheric pressure in order to reduce the upward buoyancy stress on tubing 12 during operation. The remaining upward stresses of tubing 12 during passage through the cooling chamber 14 are counteracted by the plurality of spaced, resilient straps 98 which ride in contact with the upper surfaces of tubing 12 as it passes through. The resilient straps 98 each impart a distributed force about the uppermost portion of tubing 12 to maintain it linear along the longitudinal axis of chamber 14 without applying such force that tubing 12 assumes an ellipsoidal cross-section upon taking set and passing out of chamber 14.

The foregoing discloses a novel hold-down or tensioning device for use in plastic tubing extrusion operations, which tensioning device functions to maintain the tubing in proper round and overall true dimension through the setting operation in coolant bath. The tensioning device can be preadjusted quite readily to accept any of various diameters and thicknesses of tubing while still serving to maintain finished tubing in proper round and linearity. Tensioning devices constructed in accordance with the present invention have proven to be superior as compared to any prior art attempts to guide or position the pre-set plastic tubing through its contact with a coolant medium.

Changes may be made in the combination and arrangement of elements as heretofore set forth in the specification and shown in the drawings; it being understood that changes may be made in the embodiment disclosed without departing from the spirit and scope of the invention as defined in the following claims.

What is claimed is:

1. Apparatus for use in combination with a tubing extrusion device of the type which heat extrudes continuous tubing for axial passage through a coolant filled elongated chamber, comprising:
    an elongated guide member formed as a downward opening transversely concave member and having first and second sides, said guide member being secured within said chamber to extend longitudinally axially and above the path of said tubing axial passage;
    at least one resilient means adjustably secured to opposite ones of said first and second sides, said resilient means being adjusted to form a transverse, upwardly concave and generally parabolic shape wherein the uppermost arcuate portion of said resilient means is disposed in contact with said extruded tubing passing therebeneath; and
    means for adjusting the lateral and vertical positioning of said resilient means in relation to the axial passageway of said tubing through said elongated chamber.

2. Apparatus as set forth in claim 1 wherein said at least one resilient means comprises:
    resilient strap means of approximately 6 inches width secured on said first side and adjustably secured on said second side of said elongated member to impose selected parabolic cross-section consonant with said tubing diameter.

3. Apparatus as set forth in claim 2 which is further characterized in that:
    said resilient strap means is sheet rubber of one-half inch thickness and 50 durometer hardness.

4. Apparatus as set forth in claim 1 which is further characterized to include:
    four of said resilient means disposed generally equi-spaced along said elongated guide member.

5. Apparatus as set forth in claim 1 which further includes:
    a coolant water source and water drain for maintaining water within said elongated chamber at a predetermined level; and
    tubing connected to said water source, said tubing having a plurality of release holes which are led beneath the uppermost portion of said elongated guide member and along the length thereof.

6. Apparatus as set forth in claim 5 wherein the internal angle of concavity of said elongated guide member is in the range of 90° to 110°.

7. Apparatus as set forth in claim 1 wherein the internal angle of concavity of said elongated guide member is in the range of 90° to 110°.

8. Apparatus as set forth in claim 1 wherein said elongated guide member is foraminous to allow free liquid flow therethrough.

* * * * *